United States Patent
Minoura et al.

(10) Patent No.: US 7,741,421 B2
(45) Date of Patent: Jun. 22, 2010

(54) METHODS FOR PRODUCING MACROMOLECULE-IDENTIFYING POLYMERS

(75) Inventors: Norihiko Minoura, Ibaraki (JP); Alexandre Rachkov, Kiev (UA); Tadashi Matsumoto, Tokyo (JP); Kaori Endo, Tokyo (JP); Hu Minjie, Foster City, CA (US)

(73) Assignee: Reqmed Company, Ltd., Tokyo (JP)

( * ) Notice: Subject to any disclaimer, the term of this patent is extended or adjusted under 35 U.S.C. 154(b) by 1036 days.

(21) Appl. No.: 10/548,557

(22) PCT Filed: Mar. 5, 2004

(86) PCT No.: PCT/JP2004/002852

§ 371 (c)(1),
(2), (4) Date: Jun. 13, 2006

(87) PCT Pub. No.: WO2004/081059

PCT Pub. Date: Sep. 23, 2004

(65) Prior Publication Data

US 2006/0240435 A1  Oct. 26, 2006

(30) Foreign Application Priority Data

Mar. 14, 2003 (JP) ............................. 2003-070453

(51) Int. Cl.
C08F 4/04 (2006.01)
C08F 2/16 (2006.01)
C08F 20/10 (2006.01)

(52) U.S. Cl. ..................... 526/218.1; 526/199; 526/200; 526/303.1; 526/307.7; 526/323.1; 526/323.2

(58) Field of Classification Search ................. 526/199, 526/200, 219.6, 303.1, 307.7, 323.2, 218.1
See application file for complete search history.

(56) References Cited

U.S. PATENT DOCUMENTS 6,749,811 B2 * 6/2004 Murray ........................ 422/91

FOREIGN PATENT DOCUMENTS

| JP | 2001-55399 | 2/2001 |
| JP | 2003-284947 | 10/2003 |
| JP | 2004-115748 | 4/2004 |
| WO | WO 01/61354 | 8/2001 |

OTHER PUBLICATIONS

Byrne et al. Polym. Adv. Technol., 13, 798-816 (2002).*
Byrne et al. Mat. Res. Soc. Symp. Proc., 724, N9.3.1-N9.3.7 (2002).*
Andersson et al., "Mimics of the binding sites of opioid receptors obtained by molecular imprinting of enkephalin and morphine," *Proc. Natl. Acad. Sci. USA*, 92:4788-4792 (May 1995).
Ansell et al., "Towards artificial antibodies prepared by molecular imprinting," *Clinical Chemistry*, 42(9):1506-1512 (1996).
Asanuma et al., "Molecular imprinting of cyclodextrin in water for the recognition of nanometer-scaled guests," *Analytica Chimica Acta*, 435(1):25-33 (May 2001).
Bossi et al., "Surface-Grafted Molecularly Imprinted Polymers for Protein Recognition," *Analytical Chemistry*, 73(21):5281-5286 (Nov. 2001).
Burrow and Minoura, "Molecular Imprinting: Synthesis of Polymer Particles with Antibody-like Binding Characteristics for Glucose Oxidase," *Biochemical and Biophysical Research Communications*, 227(2):419-422 (1996).
Hart and Shea, "Synthetic Peptide Receptors: Molecularly Imprinted Polymers for the Recognition of Peptides Using Peptide-Metal Interactions," *J. Am. Chem. Soc.*, 123(9):2072-2073 (2001).
Hirayama et al., "Synthesis of Polymer-Coated Silica Particles with Specific Recognition Sites for Glucose Oxidase by the Molecular Imprinting Technique," *Chemistry Letters*, 27(8):731-732 (1998).
Hjertén et al., "Gels Mimicking Antibodies in Their Selective Recognition of Proteins," *Chromatographia*, 44(5/6):227-234 (Mar. 1997).
International Search Report from International Application No. PCT/JP2004/002852.
Kempe et al., "An Approach Towards Surface Imprinting Using the Enzyme Ribonuclease A," *Journal of Molecular Recognition*, 8:35-39 (1995).
Piletsky et al., "The rational use of hydrophobic effect-based recognition in molecularly imprinted polymers," *Journal of Molecular Recognition*, 11:94-97 (1998).
Rachkov et al., "Molecularly imprinted polymers prepared in aqueous solution selective for [Sar$^1$,Ala$^8$]angiotensin II," *Analytica Chimica Acta*, 504:191-197 (Feb. 2004).
Venton and Gudipati, "Influence of protein on polysiloxane polymer formation: evidence for induction of complementary protein-polymer interactions," *Biochimica et Biophysica Acta*, 1250:126-136 (1995).
Vlatakis et al., "Drug assay using antibody mimics made by molecular imprinting," *Nature*, 361:645-647 (Feb. 1993).
Wulff, "Molecular Imprinting in Cross-Linked Materials with the Aid of Molecular Templates—A Way towards Artificial Antibodies," *Angew. Chem. Int. Ed. Engl.*, 34:1812-1832 (1995).

* cited by examiner

*Primary Examiner*—Helen L. Pezzuto
(74) *Attorney, Agent, or Firm*—Klarquist Sparkman, LLP

(57) ABSTRACT

The methods for producing macromolecule identifying polymers according to the present invention comprise the steps of polymerizing a starting monomer in an aqueous solution in the presence of a macromolecule, a crosslinking agent, and a radical polymerization initiator to produce a polymer containing the macromolecule in its interior; and removing the macromolecule from the polymer containing the macromolecule to thereby produce the macromolecule identifying polymer having a molecular imprint of the macromolecule. In this method, the crosslinker has a solubility in water at 25° C. of 100% by mass or higher.

16 Claims, No Drawings

METHODS FOR PRODUCING MACROMOLECULE-IDENTIFYING POLYMERS

CROSS REFERENCE TO RELATED APPLICATIONS

This is the U.S. National Stage of International Application No. PCT/JP04/002852, filed Mar. 5, 2004, which claims the benefit of Japanese Patent Application No. 2003-070453, filed Mar. 14, 2003.

TECHNICAL FIELD

This invention relates to methods for producing polymers which are capable of identifying macromolecules. More specifically, this invention relates to methods for producing polymers capable of identifying macromolecules in which polymerization of a starting monomer is conducted in an aqueous solution by using a particular crosslinker.

BACKGROUND ART

Recently, the process of analyzing, purifying, and detecting proteins and other macromolecules has become a staple technology in the fields of biotechnology, drug discovery, therapeutics, clinical analysis, chemical analysis, and the like. Accordingly, materials and methods capable of effectively identifying a target protein or the like are highly awaited.

To date, to meet such a need, a method has been proposed for producing a molecularly imprinted polymer which has an imprint of a protein, in which the polymer is produced by radical polymerization of a monomer and a crosslinker in the presence of the protein (Non-patent document 1). This method, however, does not disclose any particular technique to synthesize the polymer with optimal molecular identifying capacity for a particular protein, and thus, trial and error experimentation is necessary for the implementation of this method.

Most molecularly imprinted polymers are prepared in an organic solvent, such as acetonitrile or chloroform, and show selectivity for small molecules, such as sugars, amino acids, and steroids (Non-patent documents 2 to 4). More specifically, these methods use a small molecule as template to synthesize a molecularly imprinted polymer in an organic solvent. Accordingly, these methods cannot be applied to the synthesis of a molecularly imprinted polymer to be used for capturing a water-soluble macromolecule, such as a protein, wherein the synthesis has to be conducted in an aqueous solution.

Accordingly, many researchers are trying to synthesize a molecularly imprinted polymer which can selectively identify a macromolecule in an aqueous solution.

For example, researchers have attempted to entrap a protein within polysiloxane or polyacrylamide in a buffer solution to thereby form the molecularly imprinted polymer (Non-patent Documents 5 to 8). This attempt, however, suffered from the problems of insufficiently reproduced protein shape, insufficient strength and softness of the polymer, and low selectivity. Another attempt was made with the use of polyaminophenylboronic acid to embed peroxidase in the disposable microtiter plate surface coating (Non-patent Document 9).

In a more recent attempt, a molecularly imprinted polymer was synthesized by a method called "surface-imprinting procedure", to selectively capture the protein (Non-patent Documents 10 and 11). This method, involving the use of a metal ($Cu^{2+}$) chelating monomer, however, could be applied only to proteins having the special structure with histidine residue being exposed on the surface.

Another attempt involved the use of a cyclodextrin-based functional monomer for the formation of the polymer imprinted with a polypeptide molecule in an aqueous solution (Non-patent Documents 12 and 13). This method, however, is applicable only to low molecular weight compounds such as dipeptides (Phe-Phe).

Meanwhile, the inventors of the present invention have discovered an approach called "epitope approach". In this approach, a polymer imprinted with the shape of a lower molecular weight protein, which is different from the target protein but whose main structure comprises a part of the target protein, is synthesized in an organic solvent, and the target protein having the higher molecular weight is selectively entrapped by using this polymer (Patent Document 1).

[Patent Document 1] Unexamined Published Japanese Patent Application No. (JP-A) 2001-55399

[Non-patent Document 1] Angew. Chem., Int. Ed. Engl. 1995, vol. 34, pp. 1812-1832

[Non-patent Document 2] Clin. Chem., 42(1996) 1506

[Non-patent Document 3] Nature, 361(1993), 645

[Non-patent Document 4] Proc. Nat. Acad. Sci., USA 92(1995) 4788

[Non-patent Document 5] Biochim. Biophys. Acta, 1250 (1995) 126

[Non-patent Document 6] Biochim. Biophys. Res. Commun., 227(1996) 419

[Non-patent Document 7] Chromatographia, 44(1997) 227

[Non-patent Document 8] Chem. Lett., (1998) 731

[Non-patent Document 9] Anal. Chem., 73(2001) 5281

[Non-patent Document 10] J. Mol. Recogn., 8(1995) 35

[Non-patent Document 11] J. Amer. Chem. Soc., 123(2001) 2072

[Non-patent Document 12] J. Mol. Recogn., 11(1998) 94

[Non-patent Document 13] Anal. Chim. Acta, 435(2001) 25

DISCLOSURE OF THE INVENTION

The present invention has been made in view of such situation, and an objective of the present invention is to provide a macromolecule identifying polymer which has highly replicated molecular imprints, and hence, high selectivity for a macromolecule such as a protein. Another objective is to provide a method for producing such a macromolecule identifying polymer in an aqueous solution.

The inventors of the present invention conducted an extensive study to solve the problem as described above, and found that performing the polymerization reaction in an aqueous solution by using a particular crosslinker results in a molecule identifying polymer having highly replicated molecular imprints, and hence, high selectivity for the target macromolecule. The present invention has been completed on the basis of such a finding.

The summary of the present invention is described below.

The method for producing a macromolecule identifying polymer according to the present invention comprises the steps of polymerizing a starting monomer in an aqueous solution in the presence of a macromolecule, a crosslinker, and a radical polymerization initiator to produce a polymer containing the macromolecule in its interior; and removing the macromolecule from the polymer containing the macromolecule to thereby produce the macromolecule identifying polymer having a molecular imprint of the macromolecule. In this method, the crosslinker has a water solubility at 25° C. of 100% by mass or higher.

Preferably, the crosslinker is polyethyleneglycol di(meth) acrylate.

Preferably, the polyethyleneglycol di(meth)acrylate has a number average molecular weight of 400 or more.

Preferably, the crosslinker is used at 1 to 200 moles per mole of the starting monomer.

Preferably, the radical polymerization initiator is a water-soluble azo compound.

Preferably, the radical polymerization initiator has a 10 hour half-life decomposition temperature in the range of 30 to 50° C.

Preferably, the radical polymerization initiator is an azo compound represented by the following general formula (I):

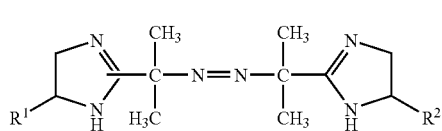

wherein $R^1$ and $R^2$ are independently a hydrogen atom or an alkyl group containing 1 to 3 carbon atoms and may be the same or different; or a salt thereof.

The macromolecule used is a polypeptide, a polynucleotide, a sugar, or a derivative thereof.

Preferably, the polypeptide is one comprising 3 to 5000 amino acids or a derivative thereof.

Preferably, the starting monomer is a vinyl monomer.

The macromolecule identifying polymer according to the present invention has a molecular imprint of the macromolecule, and comprises structural units derived from a vinyl monomer, and a structural unit derived from polyethyleneglycol di(meth)acrylate having a solubility in water at 25° C. of 100% by mass or higher. This macromolecule identifying polymer changes its volume by 5% or less when it is immersed in water.

Preferably, the structural units derived from a vinyl monomer and the structural unit derived from polyethyleneglycol di(meth)acrylate are obtained as a result of the polymerization at a ratio of 1 to 200 moles of said polyethyleneglycol di(meth)acrylate to 1 mole of said vinyl monomer.

The macromolecule identifying film according to the present invention comprises the macromolecule identifying polymer as described above.

The macromolecule identifying beads according to the present invention comprise the macromolecule identifying polymer as described above.

The method for screening a macromolecule according to the present invention is accomplished by bringing a plurality of macromolecules into contact with the macromolecule identifying film or the macromolecule identifying bead of the present invention, under the conditions in which the target macromolecule can bind to such macromolecule identifying film or beads.

Next, the method for producing a macromolecule identifying polymer according to the present invention is described in detail.

The method for producing the polymer capable of identifying a macromolecule (also referred herein to as the "macromolecule identifying polymer") according to the present invention comprises the steps of polymerizing a starting monomer in an aqueous solution in the presence of a macromolecule, a crosslinker, and a radical polymerization initiator to produce a polymer containing the macromolecule in its interior; and removing the macromolecule from the polymer containing the macromolecule to thereby produce the polymer having a molecular imprint of the macromolecule. The crosslinker has a solubility in water at 25° C. of 100% by mass or higher. The phrase "a crosslinker has a solubility in water of 100% by mass" means that 100 parts by mass of the crosslinker will dissolve in 100 parts by mass of water. This also applies to the following description. As used herein, (meth)acrylate includes methacrylate and acrylate.

Macromolecule

Macromolecules which may be used in the present invention include a polynucleotide, a polypeptide, and a sugar.

The polynucleotide used preferably comprises 3 to 5000 nucleotides. The nucleotide may be modified with other functional groups, such as a fluorescent label or isotope label.

Examples of such polynucleotides include double stranded DNA, single stranded DNA, and RNA.

The polypeptide used preferably comprises 3 to 5000 amino acids, more preferably 5 to 5000 amino acids, and most preferably 8 to 5000 amino acids. The polypeptide may be modified with a sugar chain or other functional group.

Such polypeptides are not particularly limited, and exemplary polypeptides include various proteins, such as an enzymatic protein, a bacterial protein, a microbial protein, an antigenic protein, a protein of animal or vegetable origin, and other biological proteins as well as various synthetic proteins.

Exemplary sugars used in the present invention include a monosaccharide, a disaccharide, an oligosaccharide (including a trisaccharide and tetrasaccharide), or a polysaccharide, and examples include glucose, mannose, fructose, ribose, xylose, arabinose, galactose, aldonic acid, glucitol, maltose, cellobiose, lactose, sucrose, trehalose, and maltotriose.

The term "polysaccharide" as used herein refers to sugar in a broad sense, and includes alginic acid, cyclodextrin, cellulose, and other substances that are generally found in the nature. The derivatives of such sugar include reducing sugars of such sugar, for example, a sugar alcohol [as represented by general formula: $HOCH_2(CHOH)_nCH_2OH$ (wherein n is an integer of 2 to 5)] and oxidized sugars of such sugar, for example, an aldonic acid or a uronic acid.

Starting Monomer

The matrix of the macromolecule identifying polymer produced by the production method of the present invention is polymerized from a starting monomer, which is not particularly limited for its type so long as it is soluble in water. Examples of such starting monomers include a monomer having vinyl group (vinyl monomer) and a monomer having vinylidene group.

Examples of such vinyl monomers include water-soluble organic compounds having one or more vinyl groups, for example, (meth)acrylic acid, its alkaline metal salt, styrene sulfonate, its alkaline metal salt, (meth)acrylamide, N,N-dimethylaminopropylacrylamide, and N,N-dimethylacrylamide. The metal used in the alkaline metal salt is preferably sodium or potassium, and more preferably, sodium.

Of such vinyl monomers, the preferred are N,N-dimethylacrylamide and metal acrylates, such as sodium acrylate, and the most preferred are metal acrylates, such as sodium acrylate.

Use of such a vinyl monomer enables the introduction of a functional group from the vinyl monomer into the molecular imprint in the macromolecule identifying polymer. This enables the production of a macromolecule identifying polymer with improved selectivity, owing to the synergetic effects of the interaction with the macromolecule and the molecular imprint.

The vinyl monomer as described above may be used either alone or in combinations of two or more.

The amount of the starting monomer used depends on the type of macromolecule used, and is not particularly limited. The starting monomer, however, is preferably used at an amount of 1 mole or more, more preferably 3 moles or more, and most preferably 4 moles or more per mole of the macromolecule. With regard to the upper limit, the starting monomer is preferably used at 100 moles or less, more preferably at 50 moles or less, and most preferably at 20 moles or less per mole of the macromolecule.

Use of the starting monomer in such a range enables the production of a macromolecule identifying polymer having an improved selectivity.

Crosslinker

The crosslinker used in the present invention has a solubility in water at 25° C. of 100% by mass or higher, preferably 300% by mass or more, and most preferably infinite. The term "infinite" is used for the solubility when the crosslinker dissolves in water to form a homogeneous mixture, and such homogeneous state is maintained irrespective of increase in the amount of the crosslinker added.

Examples of such crosslinkers include polyethyleneglycol di(meth)acrylate.

Such polyethyleneglycol di(meth)acrylate preferably has a number average molecular weight of at least 400, more preferably 400 to 1000, and still more preferably 500 to 800.

Use of polyethyleneglycol di(meth)acrylate is particularly preferable when the radical polymerization initiator described below is a compound represented by formula (I).

Such a crosslinker may be used either alone or in combinations of two ore more, and optionally, in combination with other crosslinkers, so long as the objective of the present invention is not adversely affected.

Use of polyethyleneglycol di(meth)acrylate as the crosslinker enables polymerization of the starting monomer in an aqueous solution at a high degree of crosslinking. This, in turn, enables precise replication of the macromolecule to the imprint, as well as production of a macromolecule identifying polymer having a high strength which does not experience collapse of the imprint. Such a macromolecule identifying polymer exhibits high selectivity.

The crosslinker is used in the present invention at an amount that allows for polymerization. For example, the crosslinker is preferably used with water at an amount (volume ratio of water to the crosslinker) in the range of 99:1 to 1:99, and more preferably 70:30 to 1:99.

The crosslinker is preferably used at an amount of, for example, 1 mole or more, more preferably 2 moles or more, still more preferably 5 moles or more, and most preferably 10 moles or more per mole of the starting monomer. With regard to the upper limit, the crosslinker is preferably used at 200 moles or less, more preferably at 100 moles or less, still more preferably at 60 moles or less, and most preferably at 40 moles or less per mole of the starting monomer.

Use of polyethyleneglycol di(meth)acrylate in such an amount enables polymerization of the starting monomer in an aqueous solution at a high degree of crosslinking. This, in turn, enables precise replication of the macromolecule to the imprint, as well as production of a macromolecule identifying polymer having a high strength which does not experience collapse of the imprint. Such a macromolecule identifying polymer exhibits high selectivity.

Since the polymer is strong and free from imprint collapse, decrease in the selectivity by repeated use of the macromolecule identifying polymer can be avoided.

Conventional macromolecule identifying polymers polymerized in an aqueous solution are formed on a substrate, such as glass, since the polymer is insufficient in its strength. Use of the crosslinker according to the present invention eliminates the necessity of such a substrate for polymer formation.

Radical Polymerization Initiator

The radical polymerization initiator used in the present invention is preferably a water-soluble azo compound.

Of the water-soluble azo compounds, preferred is a radical polymerization initiator having a 10 hour half-life decomposition temperature of 30° C. to 50° C., more preferably 35° C. to 45° C. Herein, the phrase "10 hour half-life decomposition temperature" refers to the temperature at which the amount of the radical polymerization initiator becomes ½ of its initial amount in 10 hours when it is heated to such temperature in an aqueous solution and retained at such temperature.

As described above, the radical polymerization initiator used in the present invention is preferably soluble in water and reacts at a low temperature as described above.

Such a radical polymerization initiator is preferably an azo compound represented by the following formula (I):

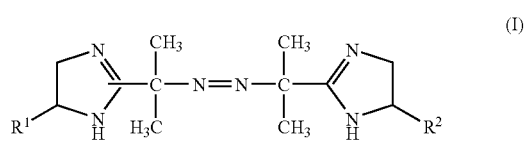

or a salt thereof.

In the formula (I), $R^1$ and $R^2$ are a hydrogen atom or an alkyl group containing 1 to 3 carbon atoms. Exemplary alkyl groups include methyl, ethyl, n-propyl, and isopropyl.

$R^1$ and $R^2$ may be the same or different, but are preferably the same.

Of the compounds as described above, the preferred is the one wherein $R^1$ and $R^2$ are both a hydrogen atom or a methyl group.

The salts of the azo compound represented by formula (I) are preferably acidic salts, such as a hydrochloride or a sulfate.

Examples of such radical polymerization initiators include:

2,2'-azobis[2-(2-imidazoline-2-yl)propane]dihydrochloride, represented by the formula:

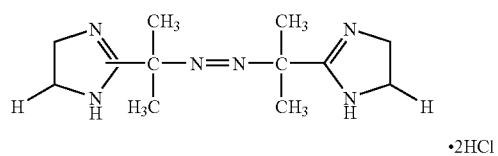

(10 hour half-life decomposition temperature: 44° C.);

2,2'-azobis[2-(2-imidazoline-2-yl)propane]disulfate dihydrate represented by the formula:

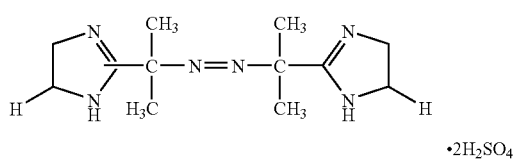

·2H$_2$SO$_4$ (10 hour half-life decomposition temperature: 46° C.); and
2,2'-azobis[2-(5-methyl-2-imidazoline-2-yl)propane]dihydrochloride represented by the formula:

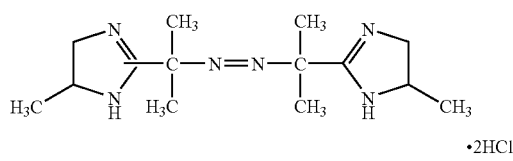

·2HCl (10 hour half-life decomposition temperature: 41° C.).

Among these, the preferred is 2,2'-azobis[2-(2-imidazoline-2-yl)propane]dihydrochloride having a 10 hour half-life decomposition temperature of 44° C.

The amount of the radical polymerization initiator used may vary according to the polymerization temperature, the type of radical polymerization initiator, and the degree of contaminant oxygen present during the radical polymerization; for example, the amount may range from $10^{-7}$ moles to 1 mole per mole of crosslinker. The preferred amount used may also be expressed in terms of the time required for completion of the polymerization; for example, the radical polymerization initiator is preferably used approximately at an amount such that the polymerization is completed within 200 hours, more preferably, within 80 hours.

Such a radical polymerization initiator may be used alone or in combinations of two or more.

Use of such a radical polymerization initiator enables efficient polymerization of the starting monomer as well as production at an improved efficiency of a highly crosslinked macromolecule identifying polymer with high strength. The resulting macromolecule identifying polymer also has improved selectivity.

Aqueous Solution

The macromolecule identifying polymer according to the present invention is synthesized by polymerization in an aqueous solution. Exemplary aqueous solutions include distilled water, purified water, ultrapure water, various salines, and pH buffer solutions such as phosphate solutions. When the aqueous solution is a saline or pH buffering solution, the solution preferably has the lowest possible concentration of each salt, at the level of up to several ten mM. When the aqueous solution is a pH buffer solution, the pH is adjusted so as to avoid denaturing the macromolecule, such as a polynucleotide, protein, or sugar.

Such an aqueous solution preferably has a pH of 3 to 10 to prevent denaturing of the macromolecule, such as a protein, and, in the case of protein, the aqueous solution is preferably maintained at a pH near the isoelectric point of the protein.

The aqueous solution used in the present invention may also have an organic solvent added thereto, so long as the organic solvent does not interfere with the activity or conformation of the macromolecule. Exemplary organic solvents include trifluoroethanol, hexafluoroisopropanol, acetonitrile, and dimethylsulfoxide.

When an organic solvent is added, it is preferably used at an amount in the range of 1 to 100 parts by volume per 100 parts by volume of the aqueous solution, although the amount may vary depending on the type of the organic solvent used.

Addition of the organic solvent within a certain range will suppress changes in the conformation of the macromolecule during the polymerization.

Other Additives

In the production of the macromolecule identifying polymer of the present invention, other additives may also be added, so long as such addition does not adversely affect the objective of the present invention. Examples of such other additives include a polymerization accelerator (e.g., N,N,N', N'-tetramethylenediamine), diluent, polymerization inhibitor, plasticizer, UV absorbent, antioxidant, antistatic, antimold agent, moisture adjusting agent, and flame retardant, which may be used either alone or in combinations of two or more.

Substrate

The molecule identifying polymer produced by the production method of the molecule identifying polymer according to the present invention is highly crosslinked, and hence, has a high strength. Accordingly, it can retain its shape without using any substrate, and can be used as is. The molecule identifying polymer, however, may also be used by forming the polymer on the substrate.

In such a case, the substrate used is preferably either an inorganic solid substance or an organic solid substance, and it may be either porous or nonporous.

Examples of inorganic substrates include silica gel, alumina, titania, zirconia, silica-alumina, zeolite, glass, and gold, among which glass and gold are more preferred.

Preferred organic substrates include beads of a cured resin, such as beads of melamine resin.

The substrate may take the shape of powders, particles, plates, and various other shapes.

Such substrate is preferably one which has been surface treated in order to improve binding strength between the substrate and the polymer of the starting monomer.

For example, when the substrate used is glass, the surface treating agent preferably has vinyl group bonded thereto. The substrate having a vinyl group on its surface can be produced by surface treating the substrate with a silane coupling agent having a vinyl group, or alternatively, by reacting the substrate having a functional group, such as an amino group, having active hydrogen on its surface with a reactive vinyl compound, such as acryloyl chloride. When such substrate having a vinyl group is used, the polymer film formed on the substrate will react with and bind to this vinyl group, and, thus, the polymer will be firmly bonded to the substrate.

When the substrate used is gold, a vinyl group can be introduced to the gold surface by bringing an organic compound which has a vinyl group and which also has an —SH group or —S—S bond for covalent bonding to the gold surface (for example, N,N'-bis(acryloyl)-cystamine) in contact with the gold.

Method for Producing a Macromolecule Identifying Polymer

The method for producing the macromolecule identifying polymer according to the present invention comprises the steps of polymerizing the starting monomer in the aqueous solution in the presence of the macromolecule, the crosslinker, and the radical polymerization initiator to produce a polymer containing the macromolecule in its interior; and removing the macromolecule from the polymer containing the macromolecule to thereby produce a polymer having a molecular imprint of the macromolecule. In this case, the crosslinker has a solubility in water at 25° C. of 100% by mass or higher.

The polymerization may be accomplished, for example, by adding the starting monomer and the crosslinker to an aqueous solution containing the macromolecule, bubbling an inert gas, such as nitrogen gas, into the mixture solution to purge oxygen, and adding a polymerization initiator and optionally a polymerization accelerator and the like to the mixture to thereby allow the polymerization to take place.

The polymerization is preferably conducted at room temperature (approx. 25° C.) to 50° C., and more preferably at a temperature in the range of 35 to 40° C., preferably for approximately 1 to 200 hours. When the polymerization temperature is lower than the above-specified range, the polymerization will be insufficient, or the formation of the macromolecule imprint may take place while the gel is swollen to detract from the high precision replication. When the polymerization temperature is higher than such range, problems may arise, such as denaturing of the target protein and the resulting undesired imprint of the denatured protein, and, in such a case, the resulting polymer may be incapable of identifying the target non-denatured macromolecule.

When the macromolecule identifying polymer is to be formed on a substrate, the polymerization may be allowed to take place on the substrate to thereby form a polymer film containing the protein or other macromolecule on the substrate.

In the method for producing a macromolecule identifying polymer according to the present invention, the macromolecule is removed from the thus formed polymer containing the macromolecule in its interior to thereby form a void at the site of the macromolecule removal, such void functioning as a keyhole for the target macromolecule.

More specifically, for example, when the macromolecule identifying polymer is formed in the form of beads (particles), the polymer containing the macromolecule produced by the polymerization is pulverized and washed with an aqueous solution or the like to thereby remove the macromolecule that had been used in forming the imprint.

When the macromolecule identifying polymer is produced in the form of a film, the aqueous solution containing the components, including the starting monomer, is polymerized on a planar substrate to thereby form a film containing the macromolecule in its interior. The film is then washed with an aqueous solution or the like to thereby remove the macromolecule that had been used in forming the imprint.

The aqueous solution used for the washing may be any one of distilled water, purified water, ultrapure water, various salines, pH buffer solutions such as phosphate solutions, and the like, as in the case of the solvent used in dissolving the macromolecule and the starting monomer.

In order to facilitate the removal of the macromolecule, the washing solution may further contain, for example, a protein denaturant, such as urea or guanidine hydrochloride, or a surfactant, such as sodium dodecyl sulfate, dodecylpyridinium chloride, or octylglycoside. When such denaturant or surfactant is used, the polymer is preferably further washed after the washing of the protein or the like to thereby remove the denaturant or the surfactant; exemplary solutions which may be used in this step include distilled water, purified water, ultrapure water, various salines, and pH buffer solutions such as phosphate solution.

The thus produced macromolecule identifying polymer may be stored by immersing in distilled water or the like.

Macromolecule Identifying Polymer and its Application

The macromolecule identifying polymer according to the present invention is a macromolecule identifying polymer having a molecular imprint of the macromolecule comprising, for example, structural units derived from the vinyl monomer, and structural unit derived from the polyethyleneglycol di(meth)acrylate, having a solubility in water at 25° C. of 100% by mass or higher.

With regard to the content of the structural units derived from the vinyl monomer and the structural unit derived from the polyethyleneglycol di(meth)acrylate, the structural unit derived from the polyethyleneglycol di(meth)acrylate is preferably incorporated at 1.5 moles or more, more preferably at 2 moles or more, still more preferably at 5 moles or more, and most preferably at 10 moles or more per mole of the structural units derived from the vinyl monomer. With regard to the upper limit in the content of the structural unit derived from the polyethyleneglycol di(meth)acrylate, this unit is preferably incorporated, for example, at 200 moles or less, more preferably at 100 moles or less, still more preferably at 60 moles or less, and most preferably at 40 moles or less per mole of the structural units derived from the vinyl monomer.

The structural units derived from the vinyl monomer and the structural unit derived from the polyethyleneglycol di(meth)acrylate are the main constituents of the macromolecule identifying polymer, and these components are preferably incorporated in the macromolecule identifying polymer at a total content of 50% by mole or more, more preferably at 90% by mole or more, and most preferably at 99% by mole or more. Exemplary other components include a monomer different from those described above, a radical polymerization initiator, and other additives.

The macromolecule identifying polymer according to the present invention as described above will enjoy a high degree of crosslinking and excellent strength. It is also substantially free from swelling by water absorption or the like or contraction by drying as well as deformation of the shape. Also, the macromolecule identifying polymer of the present invention experiences only a slight decrease in selectivity after repeated use.

The macromolecule identifying polymer preferably changes its volume after water immersion (for 24 hours or more) by 5% or less, preferably 3% or less, and more preferably 1% or less. The minimum value of the volume change is preferably 0%. The volume change of the macromolecule identifying polymer after drying the polymer that had been immersed in water is also preferably within equivalent range.

The macromolecule identifying polymer may be formed into any desired shapes including films and beads (particles).

The thickness of such film is not limited, and may vary according to its application. The thickness, however, is preferably in the range of 1 to 100 μm.

When the polymer is used in the form of beads, the average particle size is not limited, and may vary according to its application. The average particle size, however, is preferably in the range of 1 to 100 μm.

The macromolecule identifying polymer of the present invention has imprints of the macromolecule replicated at a remarkably high fidelity as well as high polymer strength with little risk of imprint deformation; therefore, it can be used in the form of a film without using a substrate.

The macromolecule identifying polymer of the present invention may be used in screening for (separating) the target macromolecule from a mixture solution containing the target macromolecule, such as a protein. Accordingly, the macromolecule identifying polymer of the present invention can be used in the screening, for example, as a sensor for detecting the particular macromolecule, such as protein, or in place of an antibody when used in an assay or measurement system that had been realized by the use of such an antibody. More specifically, the macromolecule identifying polymer in the shape of a film can be used as a molecule identifying chip, and the macromolecule identifying polymer in the shape of beads can be used as a filler for columns.

BEST MODE FOR CARRYING OUT THE INVENTION

The present invention is described in further detail below with reference to Examples, but should not be construed as being limited thereto.

EXAMPLE 1

To 2.06 mL of distilled water was dissolved 25 μmol (23.1 mg) of [Sar$^1$, Ala$^8$]-angiotensin II (manufactured by American Peptide; amino acid sequence: Sar-Arg-Val-Tyr-Ile-His-Pro-Ala, hereinafter also referred to as "SA"). To this solution were then added 100 μmol (10 μL) of N,N-dimethylacrylamide (manufactured by Wako Pure Chemical Industries, Ltd., hereinafter also referred to as "DMAAm"), 5 mmol (2.565 mL) of polyethyleneglycol diacrylate (manufactured by Aldrich, Mn=575; solubility, infinite), and 515 μL (50 mM) of sodium phosphate buffer solution (pH 7.2), and then, about 100 μL of NaOH aqueous solution (0.5 M) to adjust the pH to 7.1.

Nitrogen gas was introduced to this mixture for 30 seconds to remove oxygen. To this mixture was then added 26 μmol of 2,2'-azobis[2-(2-imidazolin-2-yl)propane]dihydrochloride (VA-044 (product name) manufactured by Wako Pure Chemical Industries, Ltd.; hereinafter also referred to as "ABIPD"; 10 hour half-life decomposition temperature, 44° C. (in water)).

The mixture was then purged with nitrogen gas for 2 minutes, and the temperature was maintained at 37° C. for 60 hours to obtain the polymer.

The resulting polymer was pulverized in mortar, and sieved to separate and collect the polymer having the particle size in the range of 0.02 to 0.045 mm. The polymer was washed 5 times with 20 mM phosphate buffer solution (10 mL, pH 5.6), and the supernatant of the solution used for washing was confirmed so that it did not contain the SA used to form the imprint. The macromolecule identifying polymer (1) having the SA removed therefrom was thereby produced.

COMPARATIVE PREPARATION EXAMPLE 1

The procedure of Example 1 was repeated, with the exception that the SA used for the imprint formation was not added in this case to thereby produce Reference polymer (1).

EXAMPLE 2

To 1.17 mL of distilled water was dissolved 20 μmol (18.5 mg) of SA. To this solution were then added 80 μmol (40 μL of 2 M aqueous solution) of sodium acrylate (manufactured by Aldrich), 3.5 mmol (1.80 mL) of polyethyleneglycol diacrylate (manufactured by Aldrich; Mn=575), 3 mmol (0.70 mL) of polyethyleneglycol diacrylate (manufactured by Aldrich; Mn=258; solubility, infinite), and 1250 μL (20 mM) sodium phosphate buffer solution (pH 7.2), and then, about 100 μL of NaOH aqueous solution (0.5 M) to adjust the pH to 7.1.

Nitrogen gas was introduced to this mixture for 30 seconds to remove oxygen. To this mixture was then added 26 μmol of ABIPD.

The mixture was then purged with nitrogen gas for 2 minutes, and the temperature was maintained at 37° C. for 60 hours to obtain the polymer.

The resulting polymer was pulverized in mortar, and sieved to separate and collect the polymer having the particle size in the range of 0.02 to 0.045 mm. The polymer was washed 5 times with 20 mM phosphate buffer solution (10 mL, pH 5.6), and the supernatant of the solution used for washing was confirmed so that it did not contain the SA used to form the imprint. The macromolecule identifying polymer (2) having the SA removed therefrom was thereby produced.

COMPARATIVE PREPARATION EXAMPLE 2

The procedure of Example 2 was repeated, with the exception that the SA used for the imprint formation was not added in this case to thereby produce Reference polymer (2).

EXAMPLE 3

The procedure of Example 2 was repeated, with the exception that the sodium acrylate was used at an amount of 160 μmol (80 μL of 2 M aqueous solution); 4 mmol (2.052 mL) of polyethyleneglycol diacrylate (manufactured by Aldrich; Mn=575) was used instead of the combined use of the polyethyleneglycol diacrylate (Mn=575) and the polyethyleneglycol diacrylate (Mn=258); and the ABIPD was used at an amount of 26 μmol to thereby produce macromolecule identifying polymer (3).

COMPARATIVE PREPARATION EXAMPLE 3

The procedure of Example 3 was repeated, with the exception that the SA used for the imprint formation was not added in this case to thereby produce Reference polymer (3).

EXAMPLE 4

The procedure of Example 3 was repeated, with the exception that the sodium acrylate was used at an amount of 320 μmol (160 μL of 2 M aqueous solution) to thereby produce macromolecule identifying polymer (4).

COMPARATIVE PREPARATION EXAMPLE 4

The procedure of Example 4 was repeated, with the exception that the SA used for the imprint formation was not added in this case to thereby produce Reference polymer (4).

Evaluation of Example 1

The particulate macromolecule identifying polymer (1) produced in Example 1 and the particulate Reference polymer (1) produced in Comparative Preparation Example 1 were filled in a stainless steel column (inner diameter, 4.6 mm; length, 10 cm) for liquid chromatography, respectively. A mixture of phosphate buffer solution (80% by volume) and acetonitrile (20% by volume) was prepared and this mobile phase was applied to the column at a column temperature of 25° C. and at a rate of 0.5 mL per min. to thereby conduct a separation assay experiment of the SA and the comparative angiotensin II (manufactured by American Peptide; amino acid sequence: Asp-Arg-Val-Tyr-Ile-His-Pro-Phe; hereinafter also referred to as "AII") and Gly-Leu-Tyr (manufactured by Sigma; hereinafter also referred to as "GLY").

The protein identifying performance of the macromolecule identifying polymer (1) and Reference polymer (1) was evaluated by a monitoring method at 215 nm using a UV detector.

The results are shown in Table 1.

In the results shown in Table 1, the value I which indicates the degree of formation of the imprint in the macromolecule identifying polymer (1), is 1.24 (0.56/0.45). This confirms that the molecular imprint of the SA was formed in the macromolecule identifying polymer (1) of Preparation Example 1.

The value I indicates a difference in the separation ability for SA between the macromolecule identifying polymer (1) having the imprint of SA and the Reference polymer (1) having no imprint; the larger difference between the value I and 1 indicates the successful formation of the SA imprint.

The value of the separation coefficient, $\alpha$, which indicates selectivity of the macromolecule identifying polymer (1) for SA was 2.80 (0.56/0.20). This confirms that this macromolecule identifying polymer (1) has the function of identifying the AII.

The value $\alpha$ indicates the ability of the macromolecule identifying polymer (1) to separate SA from AII in the use of the macromolecule identifying polymer (1), namely, selectivity for SA of the macromolecule identifying polymer (1) in the relative comparison of SA and AII, and the larger difference between the value $\alpha$ and 1 indicates the higher selectivity.

Evaluation of Examples 2 to 4

Separation assay experiments between the SA and the comparative AII and GLY were conducted for the macromolecule identifying polymers (2) to (4) produced in Examples 2 to 4 by repeating the evaluation procedure of Example 1 using the corresponding Reference polymers (2) to (4). The results are also shown in Table 1.

TABLE 1

|  | Ex. 1 | Comp. Prep. Ex. 1 | Ex. 2 | Comp. Prep. Ex. 2 | Ex. 3 | Comp. Prep. Ex. 3 | Ex. 4 | Comp. Prep. Ex. 4 |
|---|---|---|---|---|---|---|---|---|
| SA (μmol) | 25 | 0 | 20 | 0 | 20 | 0 | 20 | 0 |
| DMAAm (μmol) | 100 | 100 | — | — | — | — | — | — |
| Sodium acrylate (μmol) | — | — | 80 | 80 | 160 | 160 | 320 | 320 |
| PEGDA-575 (mmol) | 5 | 5 | 3.5 | 3.5 | 4 | 4 | 4 | 4 |
| PEGDA-258 (mmol) | — | — | 3.0 | 3.0 | — | — | — | — |
| ABIPD (μmol) | 26 | 26 | 26 | 26 | 26 | 26 | 26 | 26 |
| k(SA) | 0.56 | 0.45 | 4.25 | 3.14 | 3.19 | 1.66 | 6.63 | 4.33 |
| k(AII) | 0.20 | 0.11 | 0.16 | 0.15 | 0.11 | 0.12 | 0.14 | 0.08 |
| k(GLY) | 0.55 | 0.43 | 0.28 | 0.36 | 0.48 | 0.42 | 0.44 | 0.36 |
| I | 1.24 | — | 1.35 | — | 1.92 | — | 1.53 | — |
| α(SA/AII) | 2.80 | — | 26.56 | — | 28.25 | — | 47.40 | — |
| α(SA/GLY) | 1.02 | — | 15.18 | — | 6.59 | — | 15.10 | — |

SA: [$Sar^1$, $Ala^8$]-angiotensin II
AII: Angiotensin II
GLY: Gly-Leu-Tyr
DMAAm: N,N-dimethylacrylamide
PEGDA-575: polyethyleneglycol diacrylate (Mn = 575)
PEGDA-258: polyethyleneglycol diacrylate (Mn = 258)
ABIPD: 2,2'-azobis[2-(2-imidazoline-2-yl)propane]dihydrochloride
k(SA): Capacity coefficient of SA
{Retention time (min.) of SA in the column chromatography using a column filled with the given polymer − retention time (min.) of the void marker (acetone)}/{retention time (min.) of the void marker}
k(AII): Capacity coefficient of AII
{Retention time (min.) of AII in the column chromatography using a column filled with the given polymer − retention time (min.) of the void marker (acetone)}/{retention time (min.) of the void marker}
k(GLY): Capacity coefficient of GLY
{Retention time (min.) of GLY in the column chromatography using a column filled with the given polymer − retention time (min.) of the void marker (acetone)}/{retention time (min.) of the void marker}
I: Imprint effect (k(SA) of the macromolecule identifying polymer/k(SA) of the reference polymer)
α(SA/AII): Separation coefficient (k(SA) of the macromolecule identifying polymer/k(AII) of the macromolecule identifying polymer)
α(SA/GLY): Separation coefficient (k(SA) of the macromolecule identifying polymer/k(GLY) of the macromolecule identifying polymer)

EXAMPLE 5

To 1.634 mL of distilled water was dissolved 20 μmol (18.8 mg) of SA. To this solution were then added 200 μmol (100 μL of 2 M aqueous solution) of acrylic acid (manufactured by Aldrich), 2 mmol (1.026 mL) of polyethyleneglycol diacrylate (manufactured by Aldrich; Mn=575; solubility, infinite), 2 mmol (0.46 mL) of polyethyleneglycol diacrylate (manufactured by Aldrich; Mn=258; solubility, infinite), and 515 μL (50 mM) of sodium phosphate buffer solution (pH 7.2), and then, about 100 μL of NaOH aqueous solution (0.5 M) to adjust the pH to 7.1.

Nitrogen gas was introduced to this mixture for 30 seconds to remove oxygen. To this mixture was then added 72 μL (26 μmol) of ABIPD.

The mixture was then purged with nitrogen gas for 2 minutes, and the temperature was maintained at 37° C. for 60 hours to obtain the polymer.

The resulting polymer was pulverized in mortar, and sieved to separate and collect the polymer having the particle size in the range of 0.02 to 0.045 mm. The polymer was washed 5 times with 240 mM aqueous solution of sodium dihydrogenphosphate (7 mL, pH 5.6) and twice with 12 mM aqueous solution of sodium dihydrogenphosphate (7 mL, pH 5.6), and the supernatant of the solution used for washing was confirmed so that it did not contain the SA used to form the imprint. The macromolecule identifying polymer (5) having the SA removed therefrom was thereby produced.

COMPARATIVE PREPARATION EXAMPLE 5

The procedure of Example 5 was repeated, with the exception that the SA used for the imprint formation was not added in this case to thereby produce Reference polymer (5).

COMPARATIVE EXAMPLE 1

The procedure of Example 5 was repeated, with the exception that a combination of 44 μmol of ammonium persulfate (manufactured by Wako Pure Chemical Industries, Ltd.) and 34 μmol of tetramethylethylenediamine (manufactured by Wako Pure Chemical Industries, Ltd., hereinafter also referred to as "TEMED") was used instead of the 26 μmol of ABIPD to thereby prepare Comparative polymer (1).

COMPARATIVE PREPARATION EXAMPLE 6

The procedure of Comparative Example 1 was repeated, with the exception that the SA used for the imprint formation was not added in this case to thereby produce Reference polymer (6).

COMPARATIVE EXAMPLE 2

The procedure of Example 5 was repeated, with the exception that 19 μmol of azobismethoxyvaleronitrile (manufactured by Wako Pure Chemical Industries, Ltd., hereinafter also referred to as "ABMODV") was used instead of the 26 μmol of ABIPD to thereby Comparative polymer (2).

COMPARATIVE PREPARATION EXAMPLE 7

The procedure of Comparative Example 2 was repeated, with the exception that the SA used for the imprint formation was not added in this case to thereby produce Reference polymer (7).

Evaluation of Example 5

Separation assay experiments between the SA and the comparative GLY were conducted for the macromolecule identifying polymer (5) produced in Example 5 by repeating the evaluation procedure of Example 1 using the Reference polymer (5). The results are shown in Table 2.

Evaluation of Comparative Examples 1 and 2

Separation assay experiments between the SA and the comparative GLY were conducted for the Comparative polymers (1) and (2) produced in Comparative Examples 1 and 2 by repeating the evaluation procedure of Example 1 using the corresponding Reference polymers (6) and (7). The results are also shown in Table 2.

TABLE 2

|  | Ex. 5 | Comp. Prep. Ex. 5 | Comp. Ex. 1 | Comp. Prep. Ex. 6 | Comp. Ex. 2 | Comp. Prep. Ex. 7 |
|---|---|---|---|---|---|---|
| SA (μmol) | 20 | 0 | 25 | 0 | 44 | 0 |
| Acrylic acid (μmol) | 200 | 200 | 200 | 200 | 350 | 350 |
| PEGDA-258 (mmol) | 2 | 2 | 2 | 2 | 2 | 2 |
| PEGDA-575 (mmol) | 2 | 2 | 2 | 2 | 2 | 2 |
| ABIPD (μmol) | 26 | 26 | — | — | — | — |
| Ammonium persulfate (μmol) + TEMED (μmol) | — | — | 44 + 34 | 44 + 34 | — | — |
| ABMODV (μmol) | — | — | — | — | 19 | 19 |
| k(SA) | 2.96 | 1.43 | 0.93 | 1.25 | 0.90 | 0.96 |
| k(GLY) | 0.38 | 0.38 | 0.78 | 1.04 | 0.24 | 0.28 |
| I | 2.07 | — | 0.74 | — | 0.94 | — |
| α(SA/GLY) | 8.13 | — | 1.19 | — | 3.75 | — |

SA: [Sar[1], Ala[8]]-angiotensin II
GLY: Gly-Leu-Tyr
PEGDA-575: polyethyleneglycol diacrylate (Mn = 575)
PEGDA-258: polyethyleneglycol diacrylate (Mn = 258)
ABIPD: 2,2'-azobis[2-(2-imidazoline-2-yl)propane]dihydrochloride
TEMED: tetramethylethylenediamine
k(SA): Capacity coefficient of SA
{Retention time (min.) of SA in the column chromatography using a column filled with the given polymer – retention time (min.) of the void marker (acetone)}/{retention time (min.) of the void marker}
k(GLY): Capacity coefficient of GLY
{Retention time (min.) of GLY in the column chromatography using a column filled with the given polymer – retention time (min.) of the void marker (acetone)}/{retention time (min.) of the void marker}
I: Imprint effect (k(SA) of the macromolecule identifying polymer/k(SA) of the reference polymer)
α(SA/GLY): Separation coefficient (k(SA) of the macromolecule identifying polymer/k(GLY) of the macromolecule identifying polymer)

[Evaluation of the Volume Change]

One polymer particle having an average diameter of 67.97 μm (Polymer particle (A)) and one polymer particle having an average diameter of 38.63 μm (Polymer particle (B)) were collected from the macromolecule identifying polymer (3) produced in Example 3 which had been immersed in water for at least one day. The collection was carried out under the microscope (magnification, 400).

These polymer particles were air dried at room temperature, and change in the average diameter over time was evaluated (at 0 min., 30 min., 120 min., and 1000 min.). The average diameter was determined by measuring the diameter of the polymer particle in three directions under the microscope and calculating the average.

The results are shown in Table 3. As demonstrated in Table 3, no substantial change in the average diameter could be confirmed for either of the polymer particles (A) and (B) at 1,000 minutes, namely, after the drying of the polymer particles. This indicates that the polymer particles produced by the method of the present invention are highly crosslinked and that the imprints are reliably formed.

TABLE 3

| Time (min.) | Average diameter (μm) of the polymer particle (A) | Average diameter (μm) of the polymer particle (B) |
|---|---|---|
| 0 | 67.97 | 38.63 |
| 30 | 67.71 | 38.66 |
| 120 | 67.31 | 38.82 |
| 1000 | 67.46 | 38.10 |

INDUSTRIAL APPLICABILITY

The macromolecule identifying polymer of the present invention is produced by using a particular crosslinker for the polymerization, and therefore, it has highly reproduced imprints of the target macromolecule, and hence, high selectivity for the target macromolecule.

The invention claimed is:

1. A macromolecule identifying polymer having a molecular imprint of a macromolecule, comprising a structural unit derived from a vinyl monomer selected from the group consisting of N,N'-dimethylacrylamide, sodium acrylate, and acrylic acid, and a structural unit derived from polyethyleneglycol diacrylate having a solubility in water at 25° C. of 100% by mass or higher, wherein
said macromolecule identifying polymer changes its volume by 5% or less when it is immersed in water;
wherein said macromolecule identifying polymer is obtained by a method comprising polymerizing the vinyl monomer in an aqueous solution in the presence of the macromolecule, polyethyleneglycol diacrylate and a radical polymerization initiator to produce a polymer containing the macromolecule in its interior, and removing the macromolecule from the polymer containing the macromolecule to thereby produce the macromolecule identifying polymer having a molecular imprint of the macromolecule; and
wherein said radical polymerization initiator is an azo compound represented by general formula (I)

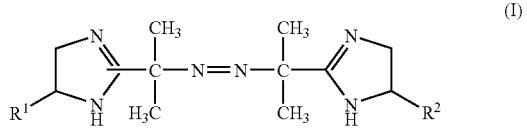

(I)

wherein $R^1$ and $R^2$ are independently a hydrogen atom or an alkyl group containing 1 to 3 carbon atoms and may be the same or different from each other, or a salt thereof.

2. The macromolecule identifying polymer according to claim 1, wherein said structural unit derived from a vinyl monomer and said structural unit derived from polyethyleneglycol diacrylate are obtained as a result of the polymerization at a ratio of 1 to 200 moles of said polyethyleneglycol diacrylate to 1 mole of said vinyl monomer.

3. A macromolecule identifying film comprising the macromolecule identifying polymer of claim 1 or 2.

4. A macromolecule identifying bead comprising the macromolecule identifying polymer of claim 1 or 2.

5. The macromolecule identifying polymer of claim 1, wherein the radical polymerization initiator is:

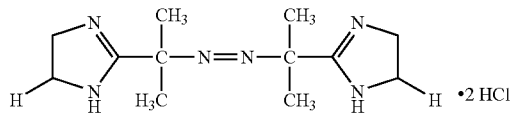

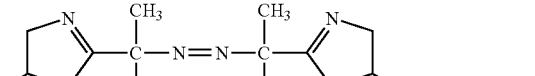

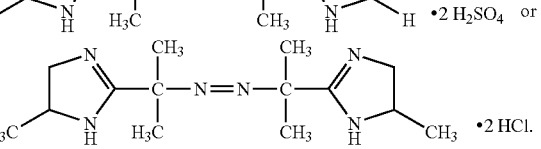

6. The macromolecule identifying polymer of claim 5, wherein the radical polymerization initiator is

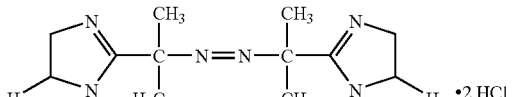

7. The macromolecule identifying polymer of claim 1, wherein the polymerization is carried out at a temperature of 25-50° C.

8. The macromolecule identifying polymer of claim 1, wherein the polymerization is carried out at a temperature of 35-40° C.

9. The macromolecule identifying polymer of claim 1, wherein the polyethyleneglycol diacrylate has a number average molecular weight of 400 or more.

10. The macromolecule identifying polymer of claim 1, wherein said macromolecule is a polypeptide, a polynucleotide, a sugar, or a derivative thereof.

11. A method for producing a macromolecule identifying polymer of claim 1, comprising the steps of
polymerizing a starting monomer in an aqueous solution in the presence of a macromolecule, a crosslinker, and a radical polymerization initiator to produce a polymer containing the macromolecule in its interior, and
removing the macromolecule from the polymer containing the macromolecule to thereby produce a macromolecule identifying polymer having a molecular imprint of the macromolecule, and wherein
said crosslinker has a solubility in water at 25° C. of 100% by mass or higher.

12. The method according to claim 1, wherein the crosslinker is polyethyleneglycol diacrylate having a number average molecular weight of 400 or more.

13. The method according to claim 11, wherein said crosslinker is used at 1 to 200 moles per mole of said starting monomer.

14. The method according to claim 11, wherein said radical polymerization initiator has a 10 hour half-life decomposition temperature in the range of 30 to 50° C.

15. The method according to claim 11, wherein said macromolecule is a polypeptide, a polynucleotide, a sugar, or a derivative thereof.

16. The method according to claim 15, wherein said polypeptide comprises 3 to 5000 amino acids or a derivative thereof.

* * * * *

UNITED STATES PATENT AND TRADEMARK OFFICE
CERTIFICATE OF CORRECTION

| | | |
|---|---|---|
| PATENT NO. | : 7,741,421 B2 | Page 1 of 1 |
| APPLICATION NO. | : 10/548557 | |
| DATED | : June 22, 2010 | |
| INVENTOR(S) | : Minoura et al. | |

It is certified that error appears in the above-identified patent and that said Letters Patent is hereby corrected as shown below:

In the Claims:

Column 19, line 1, "The method according to claim 1," should read -- The method according to claim 11, --

Signed and Sealed this

Twenty-sixth Day of October, 2010

David J. Kappos
*Director of the United States Patent and Trademark Office*